Aug. 19, 1941.       J. R. BURBRIDGE       2,253,168
FRICTIONAL CLUTCH
Filed April 17, 1940
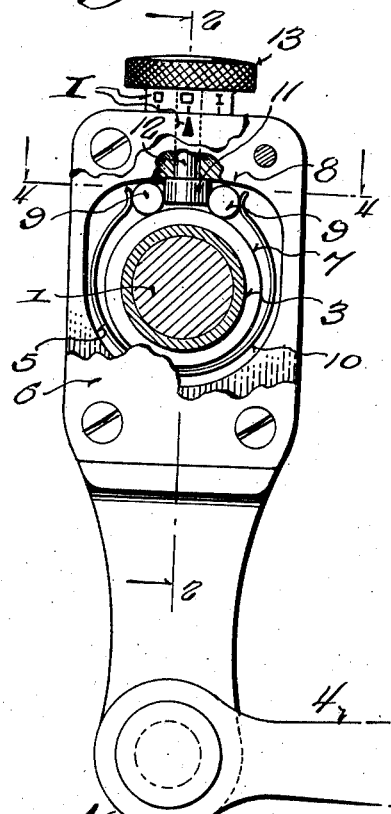
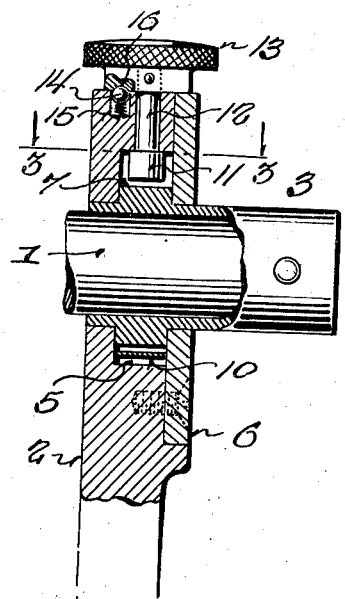
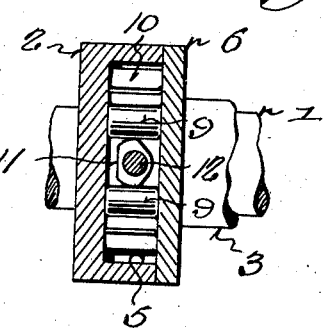
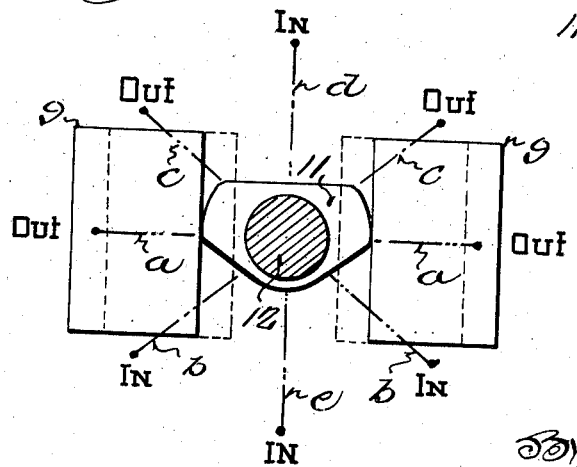
Inventor:
John R. Burbridge Patented Aug. 19, 1941

2,253,168

UNITED STATES PATENT OFFICE 2,253,168

FRICTIONAL CLUTCH

John R. Burbridge, Kenosha, Wis.

Application April 17, 1940, Serial No. 330,011

1 Claim. (Cl. 192—44)

This invention pertains generally to frictional clutches, and more particularly to a reversible clutch for either intermittent or continuous drive in opposite directions.

The invention has primarily for its object to provide an exceedingly simple and inexpensive reversible frictional clutch, particularly applicable for intermittent operation, with minimum lost movement.

Incidental to the foregoing, a more specific object of the invention resides in the provision of a frictional clutch including a pair of spaced rotatable clutch members interposed between a driving and a driven member, to provide operative connection between the two, and selectively controlled by a cam interposed between the clutch members.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

In the drawing:

Figure 1 is an elevation of one form of the invention, parts being broken away and in section;

Figure 2 is a vertical section, taken on the line 2—2 of Figure 1;

Figure 3 is a transverse section, taken on the line 3—3 of Figure 1; and

Figure 4 is an exaggerated diagrammatic showing of the clutch control mechanism in its various positions, the same being taken on substantially the line 4—4 of Figure 1.

While the present invention has many applications, such as in tools, machine tools, power transmission, and the like, for the purpose of explanation, the same has been illustrated and will be described in connection with an intermittent feed for a shaper work table.

Referring now more particularly to the accompanying drawing, the numeral 1 designates a driven shaft which, in the present instance, may be assumed to be the actuating shaft for a shaper table feed that is intermittently operated. In accordance with the primary object of the invention, the direction of rotation of the shaft may be reversed by selective setting of the clutch, as will be hereinafter described.

One form of the mechanism incorporating the principle of the present invention comprises an arm 2 loosely journaled upon a sleeve 3, pinned or otherwise secured upon the shaft 1. The lower end of the arm 2 is pivotally connected to a reciprocative link 4, which transmits oscillatory movement to the arm 2 about the axis of the driven shaft 1.

The arm 2 is provided with a recess 5 surrounding the sleeve 3, the same being closed by a cover 6 to house the clutch mechanism, and prevent entrance of foreign matter, such as dust, metal particles, and the like, and also retain necessary lubricant within the clutch.

Positioned within the recess 5 is a flange 7 carried by the sleeve 3. Here it is to be understood that the sleeve and flange structure is provided merely for manufacturing reasons, inasmuch as the flange 7 may form an integral part of the shaft 1 without departing from the principle of the present invention. As will be best noted in Figure 1, the upper edge 8 of the recess 5 diverges upon opposite sides of the vertical axis of the shaft 1, with relation to the diameter of the flange.

Positioned within the recess 5, and disposed between the periphery of the flange 7 of the upper edge of the recess, is a pair of clutch rollers 9, normally urged toward each other by an arcuate leaf spring 10.

To control operative engagement of the clutch rollers 9 between the periphery of the flange 7 and the upper edge 8 of the recess 5, a cam 11 provided with a shank 12 is interposed between the rollers. The shank 12 of the cam is journaled in the upper end of the arm 2, and has secured thereon a knurled thumb-piece 13, providing for manual manipulation of the cam 11. A spring-urged ball latch 14, positioned in a recess 15 formed in the top of the arm 12 and engaging indentations 16 formed in the bottom of the thumb-piece 13, serves to frictionally hold the thumb-piece and cam in their several selected positions.

To assist the operator in adjustment of the clutch mechanism, both the cover plate 6 and the thumb-piece 13 may be provided with indicia I to enable the operator to determine the setting of the clutch.

Primarily, the present invention includes the well known principle of either ball or roller frictional clutches, in which the clutch element provides operative engagement between a driving and a driven member in one direction, and free, relative movement in the opposite direction. In the present invention the clutch elements 9 function in a similar manner, but in opposite directions to each other.

To accomplish the desired setting of the clutch, the cam 11 is provided with a plurality of surfaces, whereby both clutch rollers 9 are held in either operative or disengaged position. Upon further selective setting of the cam 11, either roller may be held out of operative engagement, permitting the driving member to intermittently rotate the driven member in one direction. Shifting of the cam allows intermittent actuation of the driven member to be reversed. When both rollers are operatively engaged, the driven member may be oscillated in both directions. Obviously, the drive may be continuous in either direction in certain applications of the invention.

Referring more particularly to the schematic showing of Figure 4, the cam 11 is shown in adjusted position, in which the rollers 9 are held out of operative engagement by the oppositely disposed high points of the cam, indicated by the lines a—a. A clockwise shift of the cam will bring one of the faces b and the opposite point c of the cam into engagement with the rollers, whereby the roller 9 engaging the face b assumes its operative position, while the opposite roller 9 engaged by the point c is retained in operative position. A further clockwise movement of the cam allows the points d and e to contact the opposite rollers, allowing them both to assume operative positions. The foregoing operation may be accomplished upon reverse movement of the cam 11 in clockwise direction, due to the conformity of the cam 11.

From the foregoing explanation, considered in connection with the accompanying drawing, it will be seen that an exceedingly simple, inexpensive and easily manipulated frictional clutch mechanism has been provided, capable of effecting either intermittent or continuous drive in either direction, or oscillatory action.

Without close machining, it has been determined that a clutch of the present type provides for operative engagement with minimum lost movement, and, therefore, a high degree of accuracy is obtained.

Housing of the clutch mechanism not only provides against the entrance of foreign matter, such as metal, dust and the like, but also insures proper lubrication of the operative parts of the clutch, and enables ready access to the clutch elements for lubricating, cleaning, or replacement.

It is also to be understood that the operative faces of the clutch elements are substantially smooth, as compared to toothed or seriated clutch surfaces, which not only reduces cost of manufacture, but also provides for more minute control of the clutching operation.

I claim:

A reversible, frictional clutch comprising, an annular driven member provided with a substantially smooth circumferential surface, an oscillatory arm journaled about said driven member and provided with a recess surrounding said member, a pair of rollers positioned in said recess between said annular driven member and the side wall of said recess, the longitudinal axes of said driven member and clutch members being parallel, a rotatable cam journaled in said arm and disposed between said clutch members, the axis of said cam being at right angles to the longitudinal axes of said rollers, an arcuate flat spring positioned in said recess and engaging said rollers to normally urge them into operative position, and a cover for said recess.

JOHN R. BURBRIDGE.